(12) United States Patent
Seely et al.

(10) Patent No.: US 11,682,108 B2
(45) Date of Patent: Jun. 20, 2023

(54) ARTIFICIAL APERTURE ADJUSTMENT FOR SYNTHETIC DEPTH OF FIELD RENDERING

(71) Applicant: Apple Inc., Cupertino, CA (US)

(72) Inventors: Richard D. Seely, San Jose, CA (US); Alexandre Naaman, Mountain View, CA (US); Patrick Shehane, Fremont, CA (US); Andre Souza Dos Santos, San Jose, CA (US); Behkish J. Manzari, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/473,531

(22) Filed: Sep. 13, 2021

(65) Prior Publication Data

US 2021/0407050 A1 Dec. 30, 2021

Related U.S. Application Data

(63) Continuation of application No. 16/565,985, filed on Sep. 10, 2019, now Pat. No. 11,120,528.

(Continued)

(51) Int. Cl.
*G06T 5/00* (2006.01)
*G06V 30/19* (2022.01)

(52) U.S. Cl.
CPC ........ *G06T 5/003* (2013.01); *G06V 30/19127* (2022.01); *G06T 2200/24* (2013.01)

(58) Field of Classification Search
CPC ..... G06T 5/003; G06T 5/002; G06T 2200/24; G06T 2200/21; G06T 2207/10012;

(Continued)

(56) References Cited

U.S. PATENT DOCUMENTS 5,019,852 A 5/1991 Yamamoto
5,510,875 A 4/1996 Masato
(Continued)

OTHER PUBLICATIONS

Kosara, et al., "Semantic Depth of Field," 2016.
(Continued)

*Primary Examiner* — John B Strege
(74) *Attorney, Agent, or Firm* — Blank Rome LLP

(57) ABSTRACT

This disclosure relates to various implementations that dynamically adjust one or more shallow depth of field (SDOF) parameters based on a designated, artificial aperture value. The implementations obtain a designated, artificial aperture value that modifies an initial aperture value for an image frame. The designated, artificial aperture value generates a determined amount of synthetically-produced blur within the image frame. The implementations determine an aperture adjustment factor based on the designated, artificial aperture value in relation to a default so-called "tuning aperture value" (for which the camera's operations may have been optimized). The implementations may then modify, based on the aperture adjustment factor, one or more SDOF parameters for an SDOF operation, which may, e.g., be configured to render a determined amount of synthetic bokeh within the image frame. In response the modified SDOF parameters, the implementations may render an updated image frame that corresponds to the designated, artificial aperture value.

20 Claims, 8 Drawing Sheets

Related U.S. Application Data

(60) Provisional application No. 62/729,675, filed on Sep. 11, 2018.

(58) Field of Classification Search
CPC . G06T 2207/10024; G06T 7/11; G06T 7/194; G06V 30/19127
See application file for complete search history.

(56) References Cited

U.S. PATENT DOCUMENTS

| | | | |
|---|---|---|---|
| 5,621,495 A | 4/1997 | Masato | |
| 8,009,903 B2 | 8/2011 | Ojima | |
| 8,988,541 B2 | 3/2015 | Hiramatsu | |
| 9,196,027 B2 | 11/2015 | Brown | |
| 9,311,901 B2 * | 4/2016 | Webster | G09G 5/377 |
| 10,042,233 B2 | 8/2018 | Ma | |
| 10,217,195 B1 * | 2/2019 | Agrawal | G06T 7/11 |
| 10,382,712 B1 | 8/2019 | Forutanpour | |
| 10,992,845 B1 * | 4/2021 | Seely | H04N 5/2226 |
| 2009/0092282 A1 | 4/2009 | Avidan | |
| 2013/0093842 A1 | 4/2013 | Yahata | |
| 2014/0152886 A1 | 6/2014 | Morgan-Mar | |
| 2015/0002545 A1 * | 1/2015 | Webster | G09G 5/377 345/634 |
| 2015/0054986 A1 | 2/2015 | Tanaka | |
| 2017/0371129 A1 | 12/2017 | Yamaguchi | |
| 2018/0070007 A1 | 3/2018 | Molgaard | |

OTHER PUBLICATIONS

Nace, Aaron, "Create a Shallow Depth of Field in Photoshop," May 13, 2013, PHLearn, Retrieved from the Internet: URL: https://phlearn.com/tutorial/create-a-shallow-depth-of-field-in-photoshop/ [Retrieved on Sep. 9, 2019].

Wadhwa, et al., "Synthetic Depth-of-field with a Single-Camera Mobile Phone," ACM Trans. Graph, vol. 37, 2018.

\* cited by examiner

ARTIFICIAL APERTURE ADJUSTMENT FOR SYNTHETIC DEPTH OF FIELD RENDERING

TECHNICAL FIELD

This disclosure relates generally to the field of digital imaging. More particularly, but not by way of limitation, the disclosure relates to synthesizing a shallow depth of field (SDOF) based on an artificial aperture adjustment.

BACKGROUND

In camera imaging, multiple factors, such as the size of the lens aperture, may influence the depth of field (DOF) of an image. Cameras that have a lens with a wide aperture, such as digital single-lens reflex (DSLR), can be used to capture images with a relatively SDOF. SDOF denotes that the range of scene depths for which objects in the captured image will appear sharp (e.g., in focus) is relatively small compared to images captured under other conditions (e.g., a narrower lens aperture). While the limited range of in-focus regions of a SDOF image may seem to be a physical limitation, it has been turned into a visual advantage by photographers for over a century. For example, SDOF photography may particularly fit for portrait photography, since it emphasizes the subject (who is typically brought into the camera's focus range), while deemphasizing the background (e.g., by making the background appear blurry and/or out-of-focus), which may otherwise be of little interest in the scene.

The advent of mobile, multifunction devices, such as smartphones and tablet devices, has resulted in a desire for high-resolution, high dynamic range, and small form factor cameras that are capable of generating high levels of image quality. As users increasingly rely on these mobile, multifunction devices as their primary cameras for day-to-day use, users desire and demand these devices to also implement features (e.g., portrait photography) they have become accustomed with in dedicated-purpose camera bodies. Unfortunately, cameras embedded within the mobile, multifunction devices typically have difficulty in optically achieving a given level of SDOF using optics alone. For example, a mobile phone camera may have a smaller lens aperture than the smallest lens aperture used by a DSLR camera, and thus, may have a relatively larger DOF compared to the DSLR camera. Mobile phone cameras may also have other hardware limitations, such as a fixed lens aperture size that prevent the device from achieving a shallower DOF when capturing an image. In these instances, to create an image with SDOF effects, a mobile, multifunction device may artificially introduce and synthesize an out-of-focus blur after capturing an image.

Attempting to synthesize out-of-focus blur while mitigating the production of artifacts may consume relatively large amounts of computational resources and/or time. For example, a mobile, multifunction device may be able to synthesize SDOF effects by spreading every pixel in the image's light intensity onto every other pixel in the image that is within its blurring radius and adding the values in an accumulator. The mobile, multifunction device can then repeat the spreading and accumulation operation for every pixel in the image that needs to be blurred. A user may also manually intervene to fine tune and adjust the resulting image to have an acceptable synthetic SDOF effect (e.g., with minimal physically-inaccurate occlusions, mischaracterizations of foreground pixels as background pixels (or vice versa), etc.). Thus, continual improvement in digital imaging and processing techniques can be beneficial for synthesizing SDOF effects that are normally seen in images captured in high-end camera devices, such as DSLR cameras.

SUMMARY

In one implementation, a program storage device is disclosed to dynamically adjust one or more SDOF parameters based on an artificial aperture value. The program storage device causes one or more processors to obtain a designated, artificial aperture value that modifies an initial aperture value of an image frame. The designated, artificial aperture value modifies an amount of synthetically produced blur within the image frame. The program storage device then causes the processors to determine an aperture adjustment factor based on the designated, artificial aperture value and a tuning aperture value for rendering the image frame, wherein the tuning aperture value is associated with one or more default SDOF parameters. The program storage device may then modify, based on the aperture adjustment factor, the one or more default SDOF parameters to obtain updated SDOF parameters for performing one or more SDOF operations. In response to updating the SDOF parameters, the program storage device may then cause the processors to render an updated SDOF image frame using the updated SDOF parameters to perform the one or more SDOF operations.

In another implementation, a program storage device is disclosed to dynamically adjust one or more bokeh shapes for an inclusion weight parameter based on a designated, artificial aperture value. The program storage device causes one or more processors to obtain a first image frame comprising a first pixel and second pixel having pixel values and obtain a blur map that comprises a first blur value for the first pixel and a second blur value for the second pixel. The program storage device then causes the processors to determine the second pixel is a candidate pixel for the first pixel based on the first blur value and determine an inclusion weight parameter that is indicative of whether the first pixel is within a bokeh shape of the second pixel. The bokeh shape of the second pixel is distorted based on a designated, artificial aperture value for an output image frame and location of the second pixel in the output image frame. The program storage device causes the processors render the output image frame based on the inclusion weight parameter and the first image frame.

Various methods of synthesizing out-of-focus image effects in a computationally-efficient manner for captured image are also disclosed herein, in accordance with the program storage device embodiments enumerated above.

Various electronic imaging systems and/or devices are also disclosed herein, in accordance with the program storage device embodiments enumerated above. Such electronic systems and/or devices may include one or more optical sensors/camera units; a programmable control device; and a memory device coupled to the programmable control device. Instructions are stored in the memory, the instructions causing the programmable control device to perform techniques in accordance with the program storage device embodiments enumerated above.

DETAILED DESCRIPTION

Figure 1A:
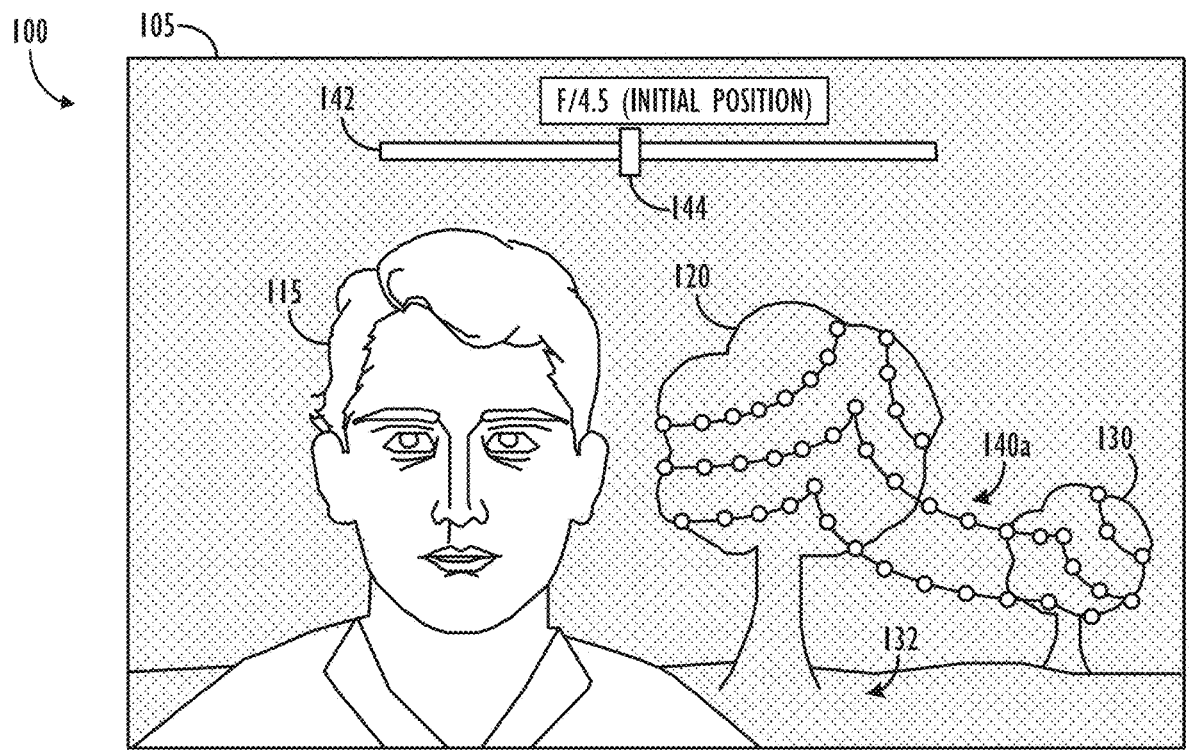
FIG. 1A is a sample image of a scene to which synthetic SDOF effects are desired to be applied.

The disclosure includes various example embodiments that dynamically adjust one or more SDOF parameters used to render synthetic SDOF effects in an image frame. In particular, the SDOF parameters correspond to one or more SDOF operations within an image processing pipeline. The image processing pipeline adjusts the SDOF parameters based on a designated, artificial aperture value (e.g., user selected artificial aperture value) in relation to a tuning aperture value (e.g., a default aperture value chosen during tuning of the image processing pipeline). As an example, the image processing pipeline can scale the SDOF parameters (e.g., blur radius) for an artifact mitigation operation based on the ratio of the designated, artificial aperture value and the tuning aperture value. By dynamically modifying the SDOF parameters, the image system is able to enhance fall-off regions within an image frame and/or mitigate artifacts that may appear when rendering synthetic SDOF effects for the image frame. Other examples of SDOF parameters the image system can utilize the designated, artificial aperture value and tuning aperture value to dynamically modify include gating threshold values and/or inclusion weight parameters for SDOF operations, such as highlight recovery operations and sampling operations. In certain implementations, the designated, artificial aperture value can also modify the shape of rendered synthetic bokeh shapes, which can mimic bokeh shapes that may occur naturally when capturing an image frame using a much larger camera with a wide aperture lens.

For purposes of this disclosure, the term "aperture" is used to refer to a "lens aperture," an "artificial aperture," or both a "lens aperture" and "artificial aperture." Therefore, unless otherwise specified within the disclosure, the use of the term "aperture" can be interchanged throughout this disclosure with the term "lens aperture" and/or "artificial aperture" depending on the context of the disclosure. As used herein, the term "artificial aperture" relates to processing one or more image frames to synthetically produce blur (e.g., bokeh shapes and/or Gaussian blur) within the image frames. "Artificial aperture" does not represent a physical opening inside a lens for an image capture device. Instead, the term "artificial aperture" denotes producing specified amounts of blur within image frames based on image processing operations and without physically adjusting the "lens aperture" of the corresponding image capturing device.

As used herein, the term "lens aperture" refers to a physical opening inside a lens of an image capturing device, where light travels through the physical opening when capturing an image frame. In one or more embodiments, the size of the "lens aperture" can be adjusted to have varying physical sizes using stop structures, such as aperture blades and/or aperture inserts. The stop structures can be adjusted to form a "lens aperture" with a given size and shape (e.g., the shape could be a circle, polygon, octagon, etc.). The image capturing device can adjust the size of the "lens aperture" using discrete steps known as "focal-stops" ("f-stops"), or in a continuously variable manner dependent on the lens design. "F-stops" can be expressed as f/N (e.g., f/1.8, f/3.5, f/5.6, f/8, and f/16), where the variable f represents the focal length and the variable N represents the f-number. Each "f-stop" represents a specific diameter of the "lens aperture" in response to adjusting the stop structures (e.g., aperture blades). For example, if a lens has a focal length of 50 millimeters (mm) and the image capturing device sets the "f-stop" to f/10, the diameter of the "lens aperture" created from the stop structure will be 50 mm/10, which equals five mm across. Within this disclosure, the term "lens aperture" can also be referenced and interchangeable with the term "lens iris." It is to be understood that, in some cases, an image capturing device may not have an adjustable physical aperture, i.e., the image capturing device may have a fixed lens aperture.

Within this disclosure, the term "artificial aperture value" represents a different aperture value that may cause a change in the characteristics being applied at the current aperture value (e.g., which may involve changing a specific amount of synthetic blur an image system will apply to an image frame). It is to be understood that, in some implementations, characteristics other than an amount of blurring that is applied may be changed, e.g., the shape or color of a blur that is applied may also be adjusted, depending on the preferred aesthetic of the given implementation and the particular artificial aperture value. The amount of synthetic blur the image system applies to an image frame can mimic an actual and/or relative amount of blur an image capture device would actually capture via a lens. For example, when the image system sets and/or adjusts the "artificial aperture value" to f/2.0, the amount of synthetic blur an image system applies to an image frame would attempt to mimic the actual amount of blur that a larger image capturing device with an equivalent focal length would have produced when capturing the image frame using a "lens aperture" value of f/2.0. Additionally or alternatively, the image system can attempt to mimic the relative amount of blur by synthetically generating the same amount of change in blur the image capturing device would generate for an image frame when moving from one "lens aperture" value (e.g., f/4.0) to another "lens aperture" value (e.g., f/2.0).

For the purposes of this disclosure, the term "larger artificial aperture value" refers to an increase in the amount of synthetic blur an image system applies to an image frame, and the term "smaller artificial aperture value" refers to a decrease in the amount of synthetic blur the image system applies to the image frame. An image system can represent "artificial aperture values," "larger artificial aperture values," and "smaller artificial aperture values" using a variety of different scales. For example, the disclosure generally refers to "artificial aperture values" as "f-stops," where the size of the aperture is expressed as a ratio of the lens' focal length. An artificial aperture value set to f/2.0 is relatively larger than an artificial aperture value set to f/4.0. Other embodiments of image systems could utilize "transmission-stops (T-stops)" or other scales, such as the absolute aperture size or a numeric-based scale, to represent the "artificial aperture values." As an example, an image system can utilize a numeric scale from 0-10, where a larger number (e.g., 5) for the numeric scale represents a larger artificial aperture value than a smaller number (e.g., 2) for the numeric scale.

Within this disclosure, the term "lens" refers to an optical lens assembly, which could include multiple optical lens elements. In one or more embodiments, the "lens" may be moved to various positions to capture images at multiple depths and, as a result, multiple points of focus. Further, the term "lens" may refer to any kind of optical lens, such as a telephoto, wide angle, fixed focal length (e.g., prime) or a variable focal length (e.g., zoom) lens. As such, the term "lens" can mean a single optical lens element or multiple optical lens elements formed into a stack or other arrangement. In like manner, the term "camera" refers to a specific type of image capturing device with at least one single lens assembly along with one or more sensor elements and other circuitry utilized to capture an image frame. As an example, two or more cameras may share sensor elements and other circuitry (e.g., image signal processor (ISP)), but include two different lens assemblies. Alternatively, two or more cameras may include separate lens assemblies, as well as separate sensor elements and circuitry.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

FIG. 1A illustrates an embodiment of an image frame 100 of a scene 105 at a tuning aperture value (e.g., a default aperture value that may be associated with a plurality of default SDOF parameters used in the performance of synthetic SDOF rendering operations by an image processing pipeline). The scene 105 comprises human subject 115 in the foreground of scene 105, as well as several elements in the background of scene 105, such as trees 120 and 130, ground 132, and individual point light sources 140a. The background of scene 105 in image frame 100 is shown as largely white with a slight gray overlay to indicate that the background is slightly blurred based on the tuning aperture value. As an example, point light sources 140a in image frame 100 are slightly blurred with one or more distinct colors. In certain implementations, the point light sources 140a may fully saturate the corresponding pixels on the camera's image sensor causing the corresponding pixels to appear as clipped in an input image (not shown in FIG. 1A), even if such light sources actually had a distinct color in scene 105. In FIG. 1A, an image processing pipeline may recover the colors for the point light sources 140a within image frame 100.

In one or more embodiments, an image system may display the image frame 100 as part of a graphical user interface (GUI) viewer that includes a GUI element 142. One example of a GUI viewer that could display image frame 100 is a live preview viewer that displays image frame 100 and/or other image frames as part of capturing process (e.g., preview an image frame, video recording, or live streaming). Other examples of GUI viewers could be a photo viewing/editing viewer and/or a video viewing/editing viewer that displays image frame 100 and/or other image frames after capturing and storing the image frame 100 as an image data file or part of a video data file. A user is able to utilize the GUI element 142 to adjust (e.g., increase and decrease) the artificial aperture value for image frame 100. Adjusting the artificial aperture value using the GUI element 142 modifies the amount of blur that an image processing pipeline may generate for one or more regions of image frame 100. It is to be understood that, in some embodiments, when the artificial aperture value is adjusted during as part of a live preview stream, the changes made to GUI element 142 may not impact the image frame that is concurrently displayed in the live preview viewer but may instead impact one or more future displayed preview image frames.

As shown in FIG. 1A, the GUI element 142 can be a slider GUI element, where a user is able to move the control indicator 144 left or right to positions that correspond to different artificial aperture values. Using FIG. 1 as an example, a user may move control indicator 144 in a left direction (e.g., direction away from trees 120 and 130) to achieve a relatively larger artificial aperture value that increases the amount of synthetic blur in one or more regions of image frame 100. Alternatively, a user may move control indicator 144 in a right direction (e.g., direction towards trees 120 and 130) to achieve a relatively smaller artificial aperture value to decrease the amount of blur shown in one or more regions of image frame 100. In FIG. 1, the control indicator 144 is initially set to an initial default position representative of the tuning aperture value. Additionally, or alternatively, the initial position could represent the last aperture value that a user previous set for the image frame 100. Other implementations could have the GUI element 142 slide in a reverse direction to increase the artificial aperture value and/or the GUI element 142 in a different position such that the control indicator 144 slides in a different direction (e.g., up and/or down).

As discussed above, the tuning aperture value may represent a default aperture value, e.g., that the image processing pipeline has been optimized for, and which may be used when SDOF operations are being performed on image frame 100. Such SDOF operations may be performed when the camera is activated or when a user specifically activates an SDOF feature of the camera, e.g., in a live camera mode or photo preview mode. As an example, the tuning aperture value could represent the actual physical lens aperture that a camera uses to capture image frame 100. In another example, the tuning aperture value represents a default aperture value that the image processing pipeline is optimized for when processing image frame 100. Other examples could have the tuning aperture value represent both the lens aperture used to capture image frame 100 and the default aperture value that the image processing pipeline is optimized for when processing image frame 100. To explain further, in some examples, the tuning aperture value may correspond to the optical lens aperture the camera is physically operating at (e.g., f/4.5), or, in other examples, it could be optimized to a different lens aperture value (e.g., f/2.4). In other examples, if a camera has an adjustable aperture, the tuning aperture value could correspond to one of the physical lens aperture values that the camera could be adjusted to. In still other examples, a given camera could have multiple tuning parameter values, e.g., if a camera had an adjustable aperture design with different adjustable SDOF pipelines for each physical aperture value the camera could be operated at, there could thus be different "default," i.e., tuning aperture values for each of the camera's physical aperture positions.

Figure 1B:
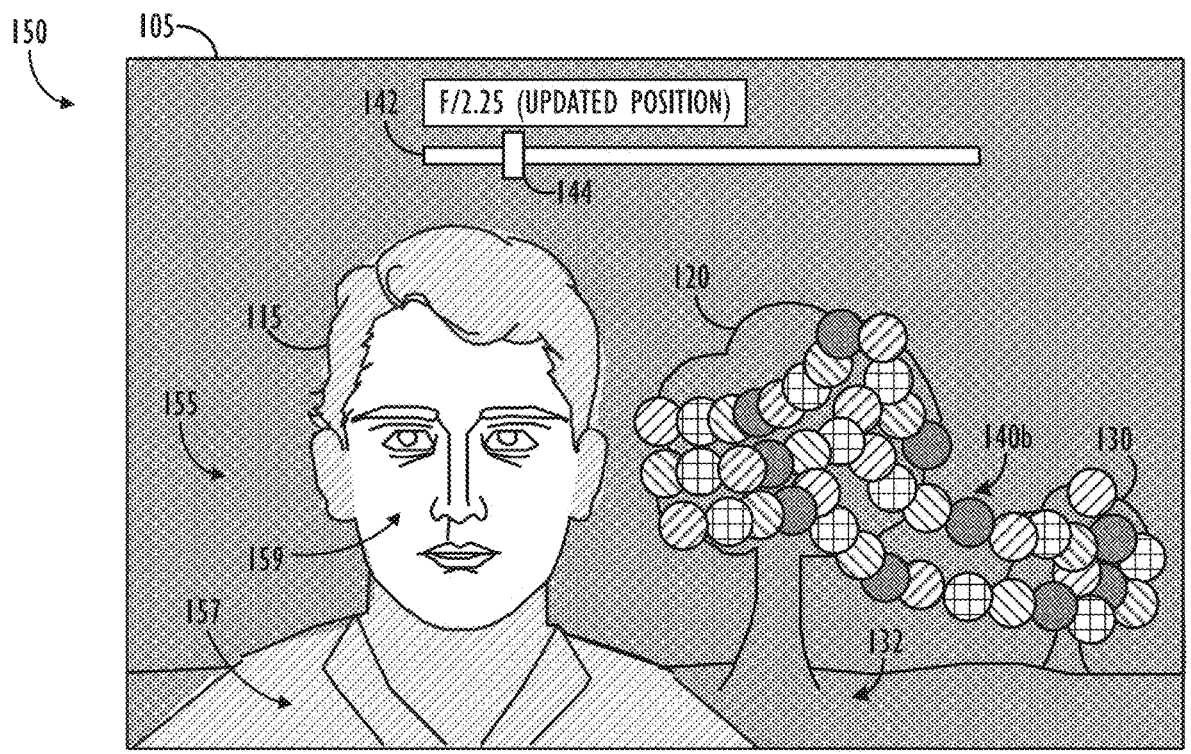
FIG. 1B is a sample image of a scene to which synthetic SDOF effects have been applied, according to one or more embodiments.

FIG. 1B illustrates another embodiment of an image frame 150 of scene 105 at a designated, artificial aperture value. Image frame 150 is the same image frame 100 as shown in FIG. 1A except that DOF for image frame 150 is relatively shallower than the DOF for image frame 100. Stated another way, sample image 150 includes synthetic SDOF effects that are based on the designated, artificial aperture value (e.g., f/2.25) being relatively larger than the tuning aperture value (e.g., f/4.5). In FIG. 1B, a user sets the designated, artificial aperture value to a larger value by sliding the control indicator 144 in the left direction and to a specific position of GUI element 142.

As compared to image frame 100 in FIG. 1A, FIG. 1B depicts that the background in image frame 150 is shown as largely having a relatively dark gray overlay, indicating a synthetically blurred background region 155 of the image frame 150. An image system that is running the GUI viewer produces the synthetically blurred background region 155 by blurring (or otherwise made to appear out-of-focus) the background using an image processing pipeline. FIG. 1B also illustrates that image frame 150 includes a region of interest 159 that remains in focus (e.g., no overlay) after adjusting to the artificial aperture value. As shown in FIG. 1B, the region of interest 159 corresponds to the face of human subject 115.

Image frame 150 also includes a transition region 157, which is shown with a relatively lighter gray overlay than used to represent the synthetically blurred background region 155. The relatively lighter gray overlay represents that the transition region 157 includes a relatively smaller amount of synthetic blur than the synthetically blurred background region 155 but is not as sharp as the region of interest 159. In other words, the transition region 157 represents a region between a defined sharp region (e.g., region of interest 159) and the synthetically blurred background region 155. In one or more implementations, the transition region 157 include one or more fall-off regions. To generate transition region 157, an image processing pipeline may utilize parameter gradients (e.g., fall-off gradients) to provide synthetic blur in image frame 150. In one or more embodiments, the transition region 157 correspond to portions of the foreground regions and/or in-focus regions within image frame 150 that are outside the region of interest 159. Additionally, or alternatively, the shape of the transition region 157 could be defined by an ellipse and/or circle or determined by an object boundary.

FIG. 1B also illustrates that the synthetically blurred background region 155 includes individual point light sources 140a that are blurred with bokeh shapes. Recall that with reference to FIG. 1A, that individual point light sources 140a can be bright enough that they saturate the corresponding pixels on the camera's image sensor. An image system utilizing an image processing pipeline may determine the color of the individual point light sources 140a (e.g., highlight recovery operations) and enlarge and blur the individual point light sources 140a using bokeh shapes. As seen in FIG. 1B, adjusting the artificial aperture value synthetically alters the appearance of the individual point light sources 140b by producing synthetic bokeh shapes. FIG. 1B depicts the synthetic bokeh shapes for the individual point light sources 140a are circular-based shapes. Although not explicitly shown in FIG. 1B, one or more of the synthetic bokeh shapes for point light sources 140b could be symmetrical and have the same size. Other embodiments of image frame 150 could have the synthetic bokeh shapes resemble other shape types (e.g., heart shapes, star shapes, polygon shapes, octagon shapes, or combinations of different shapes) or compressed versions of the synthetic bokeh shapes. Additionally, or alternatively, one or more of the synthetic bokeh shapes for point light sources 140b could vary in sizes and can align to an image center of image frame 150. Having compressed version of the synthetic bokeh shapes and aligning synthetic bokeh shapes to the image center of an image frame are discussed in more detail with reference to FIGS. 6 and 7.

Although FIGS. 1A and 1B illustrates specific implementations of image frames 100 and 150, respectively, the disclosure is not limited to these particular implementations. For example, even though FIGS. 1A and 1B illustrate using a single GUI element to establish the designated, artificial aperture value, other implementations of the GUI viewer could utilize other GUI elements or combinations of GUI elements to have a user set the designated, artificial aperture value. In certain implementations, the designated, artificial aperture value is not manually set, and instead is automatically set by the image processing pipeline using information, such as application settings, user preferences, and/or history of SDOF processing for previous images (e.g., the most frequently used designated, artificial aperture value for a given camera). Additionally, although FIG. 1B illustrates the region of interest that corresponds to the face of human subject 115, other objects within scene 105 could be designated as a region of interest. The image frame 150 may also have more than one region of interest when processing image frame 150 through an image processing pipeline.

The use and discussion of FIGS. 1A and 1B are only examples to facilitate ease of description and explanation. In particular, FIG. 1B is a general approximation of applying synthetic SDOF effects within an image frame 150 and should be not be interpreted as a precise or an accurately scaled portrayal of the amount of synthetic blur applied to an image frame 150. The use of gray overlays are for representative purposes and generally depict examples of different region types within image frame 150. The exact boundaries of each region within the image frame 150 and the amount of applied blur for each region are not accurately shown in FIG. 1B. The degree of shading in the gray overlays are for the purposes of generally representing that there is a difference in the amount of synthetic blur applied between the region of interest 159, the synthetically blurred background region 155, and the fall-off region 157. The actual amount of synthetic blur an image processing pipeline applies can vary from region to region and within each region itself. Producing synthetic SDOF effects (e.g., bokeh) generally shown in image frame 150 are discussed in more detail below.

Figure 2:
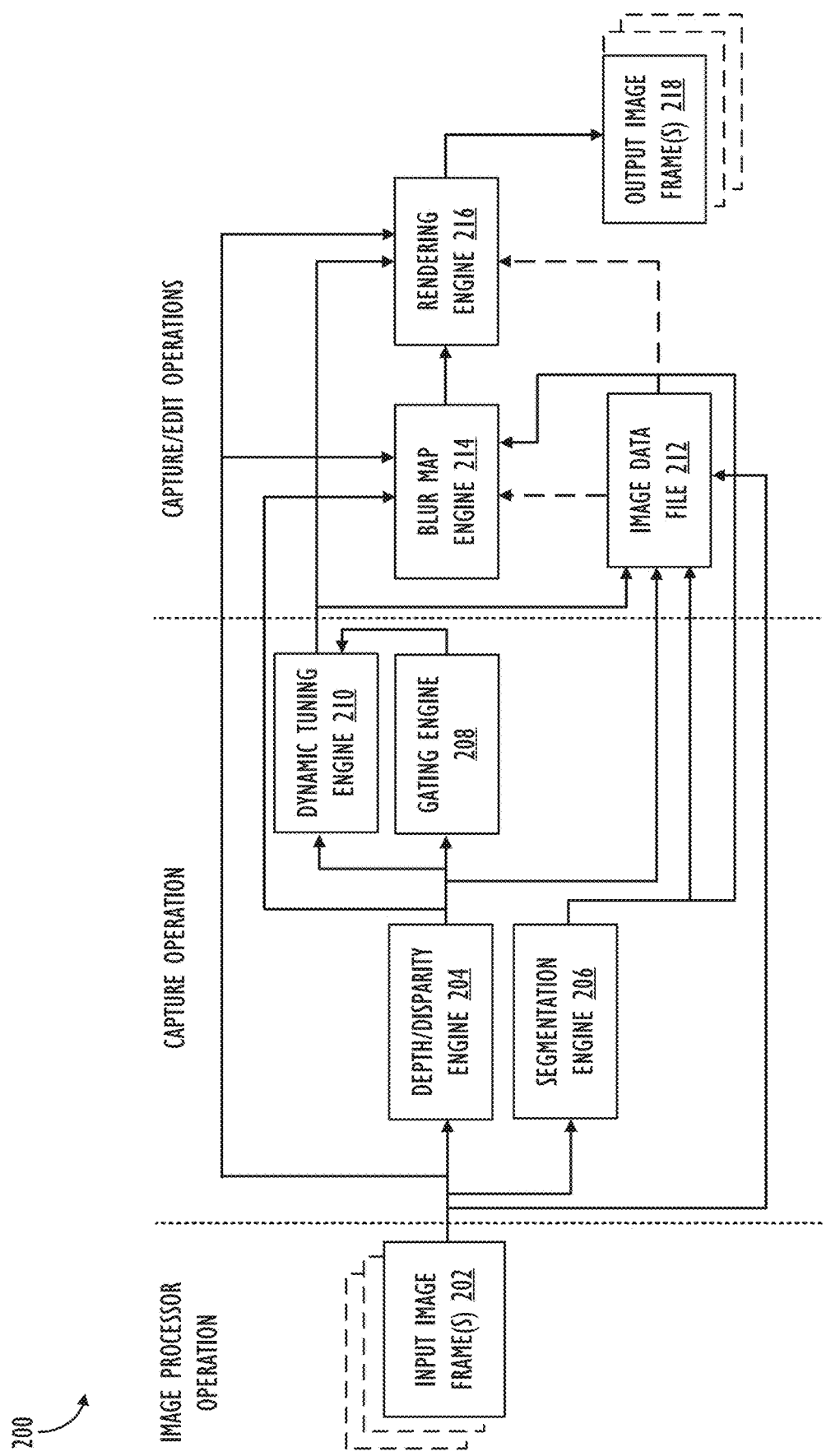
FIG. 2 is an exemplary image processing pipeline for synthesizing SDOF effects, according to one or more embodiments.

FIG. 2 is a block diagram of an embodiment of an image processing pipeline 200 that an image system uses to produce synthetic SDOF effects within an image frame, such as image frame 150 shown in FIG. 1B. The image processing pipeline 200 may be implemented based on one or more applications (e.g., live preview viewer application, a photo editing application, and/or a video editing application) that utilize one or more processors of an image system. As an example, the application that implements image processing pipeline 200 may employ a graphics application program interface (API) to generate a variety of API calls. The API calls cause a CPU to generate graphics commands that are subsequently provided to a graphics processing unit (GPU) for execution in order to render synthetic SDOF effects within the image frame. Examples of API calls include draw calls for graphics operations and dispatch calls for computing operations. Examples of graphics API that an application implementing image processing pipeline 200 may utilize include OpenGL®, Direct3D®, or Metal® (OPENGL is a registered trademark of Hewlett Packard Enterprise Development LP; DIRECT3D is a registered trademark of Microsoft Corporation; and METAL is a registered trademark of Apple Inc.). One implementation of an image system is described in more detail with reference to FIG. 10.

The image processing pipeline 200 is able to account for multiple artificial aperture values when rendering synthetic SDOF effects during capturing operations of an image frame and/or when editing (e.g., post processing operations) an image frame. As shown in FIG. 2, in one example, the image system implements the entire image processing pipeline 200 within capturing operations of an image frame (e.g., previewing an image frame or video recording). In another example, the image system performs one or more portions of the image processing pipeline 200 as part of edit operations that occur after capturing and storing image frames as a data files (e.g., Joint Photographic Experts Group (JPEG) image files, raw image files, Portable Network Graphics (PNG) image files, and High Efficiency Image Format (HEIF) image files). Using FIG. 2 as an example, the blur map engine 214 and rendering engine 216 can be implemented as part of the capture operation (e.g., when previewing an image frame) or as part of the edit operation, which is a post processing operation that occurs after capturing and storing the image frame to image data file 212.

The image processing pipeline 200 begins with receiving one or more input image frames 202. In FIG. 2, the input image frames 202 may be generated from one or more image processors (e.g., an ISP) within an image capturing device, such as a camera. In one or more embodiments, the image capturing device is embedded with an image system that performs SDOF operations associated with image processing pipeline 200. For example, the image processing pipeline 200 receives input image frames 202 from an embedded camera that is part of a mobile, multifunction devices. The camera may capture and encode the input image frames 202 using one of several possible color models, such as red green blue (RGB) color models (e.g., standard (sRGB) and Digital Cinema Initiatives P3 (DCI-P3)) or YUV color models (e.g., BT.601 and BT.709). Although FIG. 2 generally pertains to when the image system includes an embedded image capturing device, other embodiments of the image processing pipeline 200 could have the image capturing device (e.g., lens and image processors) externally to the image system.

As part of the capturing operation, FIG. 2 illustrates that the image processing pipeline 200 includes a segmentation engine 206 that receives and processes the input image frames 202 generated from the image processors. In one or more embodiments, the segmentation engine 206 may use color, object recognition, feature and/or edge detection, and/or a variety of other parameters within the input image frames 202 to segment and generate one or more segmentation masks. Each segmentation mask could provide a per-pixel classification of pixels in the image, such as foreground versus background or person versus non-person. The segmentation masks may be binary, multi-class, or continuous and could be generated from a neural network or other machine learning-based operation. The segmentation engine 206 may also generate confidence masks that correspond to the segmentation masks. The confidence masks provide an indication of the confidence that a given neural network or other machine learning-based operation has in its segment classification of any given pixel in the input image frames 202.

FIG. 2 also illustrates that as part of the capturing operation, the image processing pipeline 200 provides the input image frames 202 generated from the image processors to a depth/disparity engine 204. According to some embodiments, the depth/disparity engine 204 may obtain depth and/or disparity estimates for the input image frames 202 from available sensor information, such as defocus information, phase detection pixels, or other desired modalities. Stated another way, the depth/disparity engine 204 may utilize information obtained from the image capturing device and/or other types depth and/or disparity sensors (e.g., a stereo pair image or structured lighting) to estimate depths and/or disparity information for the input image frames 202. For example, the depth/disparity engine 204 can estimate disparity and/or depth information by performing an iterative joint optimization using both the left input image frame and right input image frame of a stereo pair image. Other embodiments of the depth/disparity engine 204 may use other sensor information and/or other operations known by persons of ordinary skill in the art to estimate the depth and/or disparity information for the input image frames 202.

The estimated depth and/or disparity information from the depth/disparity engine 204 may then be sent to a gating engine 208 for processing. The gating engine 208 may use the depth and/or disparity information to compute one or more gating values (e.g., clipping and exposure scores) used downstream (e.g., rendering engine 216) in the image processing pipeline 200. For example, gating engine 208 could perform gating operations that computes one or more scores to classify whether pixels from an input image frame 202 are clipped background pixels. To determine whether a pixel is a clipped background pixel, the gating engine 208 could initially utilize disparity and/or depth information to generate a background score that indicates a likelihood a pixel belongs to the background of an input image frame 202. Using one or more soft threshold values (e.g., a smoothstep function), the gating engine 208 may also compute one or more clipping scores that indicate whether an ISP has clipped color values for pixels. Afterwards, gating engine 208 combines the clipping scores and background scores to generate a resulting background, clipping score. Other scores the gating engine 208 could calculate include an exposure score that indicates a light level for a scene when capturing the input image frame 202, a highlight recovery score, and/or a highlight boosting score. The rendering engine 216, which is located father downstream in the image processing pipeline 200, could subsequently use one or more scores from gating engine 208 to perform SDOF operations. As an example, the gating engine 208 could compute a single score that indicates whether to and/or the strength level to perform highlight recovery and boosting operations with rendering engine 216.

As shown in FIG. 2, gating information can be sent to dynamic tuning engine 210. The dynamic tuning engine 210 generates one or more tuning parameters that could be altered based on image information, such as light level and image content. In particular, the image processing pipeline 200 could be initially optimized for one or more tuning parameters when generating one or more output image frames 218. The image processing pipeline 200 can subsequently adjust SDOF parameters associated with downstream SDOF operations using the defined tuning parameter values. As an example, the dynamic tuning engine 210 may use the depth and/or disparity information to establish default and/or optimized values for the different tuning parameters. One of the tuning parameters the dynamic tuning engine 210 could define is the tuning aperture value discussed with reference to FIGS. 1A and 1B. Initially setting the tuning aperture value could allow subsequent SDOF operations, such as artifact mitigation operations and sampling operations, to dynamically adjust when the image processing pipeline 200 receives a designated, artificial aperture value that differs from the tuning aperture value. Other tuning parameters the dynamic tuning engine 210 could define could include estimates of scene illumination sources (e.g., illumination map), confidence for disparity, blur, alpha, and/or segmentation, and/or image noise levels.

As previously discussed, some portions of the image processing pipeline 200 can be implemented as part of a capturing operation and/or an editing operation. Using FIG. 2 as an example, blur map engine 214 and rendering engine 216 can be part of a capturing operation or part of an editing operation once image information (e.g., values for tuning SDOF parameters) are saved into an image data file 212. Recall that capturing operation refers to operations that an image system may perform when capturing input image frames 202 and prior to saving the images frames into a data file (e.g., image data file 212). Editing represent postprocessing operations that occur after capturing and saving the input image frames 202 into the data file (e.g., image data file 212). FIG. 2 illustrates that tuning parameters (e.g., tuning aperture value) generated from dynamic tuning engine 210, depth and/or disparity information from depth/disparity engine 204, and segmentation information (e.g., segmentation masks) from segmentation engine 206 can be saved into image data file 212. Examples of image data file 212 include a raw image file, a JPEG image file, a Tagged Image File Format (TIFF) image file, a PNG image file and a HEIF image file. By saving the image information (e.g., as metadata) into image data file 212, the image processing pipeline 200 is able to utilize the image information to edit the input image frames 202 and render an output image frame 218 with SDOF effects.

As shown in FIG. 2, for a capturing operation, the blur map engine 214 receives depth and/or disparity information from depth/disparity engine 204 and segmentation information (e.g., segmentation masks) from segmentation engine 206 to generate a blur map. In edit operation, the blur map engine 214 receives the depth and/or disparity information and segmentation information from the image data file 212. The blur map indicates the amount of blurring that should be applied to each pixel within an input image frame 202. According to some embodiments, the blur map engine 214 generates a blur map that includes a two-dimensional array of blur values. Each blur value could represent a blur radius, diameter, or other parameter indicative of a blurring circle of confusion for pixel in the input image frame 202. The blur map is then sent to the rendering engine 216 for processing.

As shown in FIG. 2, the rendering engine 216 receives tuning parameters and a blur map outputted from the blur map engine 214 to generate output image frame 218. In capturing operations, the rendering engine 216 receives the tuning parameters directly from the dynamic tuning engine 210. In editing operations, the rendering engine 216 would receive the tuning parameters from image data file 212. The rendering engine 216 may use subsequently use information from the engines 204, 206, 208, 210, and 214 to render output image frame 218. In one or more embodiments, the rendering engine 216 may utilize the tuning aperture value to balance the blur level and artifacts for an output image frame 218. Referring back to FIGS. 1A and 1B as an example, the background of image frame 100, trees 120 and 130, and point light sources 140a may be synthetically blurred to a degree that reduces the number of artifacts visible in image frame 100 when compared to image frame 150. When an image processing pipeline 200 receives a designated, artificial aperture value that differs from the tuning aperture value, the rendering engine 216 can dynamically modify SDOF parameters values to update the production of synthetic SDOF effects. As previously discussed with reference to FIG. 1B, the designated, artificial aperture value may be obtained from one or more user inputs associated with interacting with a GUI element and/or automatically determined based on a variety image information and/or settings.

When rendering engine 216 receives a designated, artificial aperture value that has a different aperture value than the tuning aperture value, the rendering engine 216 may compute one or more aperture adjustment factors to dynamically modify SDOF parameter values. For example, the rendering engine 216 can utilize the designated, artificial aperture value and tuning aperture value to generate an aperture adjustment scaling factor, such as a linear scaling factor and/or non-linear scaling factor (e.g., polynomial or square root) to dynamically adjust one or more SDOF parameter values. Additionally, or alternatively, the rendering engine 216 may use the designated, artificial aperture value to perform one or more lookup operations to determine an aperture adjustment factor. Once the rendering engine 216 computes the aperture adjustment factors, the rendering engine 216 can then dynamically update SDOF parameters values to render output image frame 218. By doing so, the image processing pipeline 200 could save computation resources and time that may be used if the image processing pipeline 200 had to re-compute and/or re-implement the entire image processing pipeline 200 using the designated, artificial aperture value. Examples of SDOF parameters that a rendering engine 216 may update with aperture adjustment factors include parameter gradients for an artifact mitigation operation, gating threshold values for highlight recovery and boosting operations, and inclusion weight parameters for sampling operations.

Figure 3:
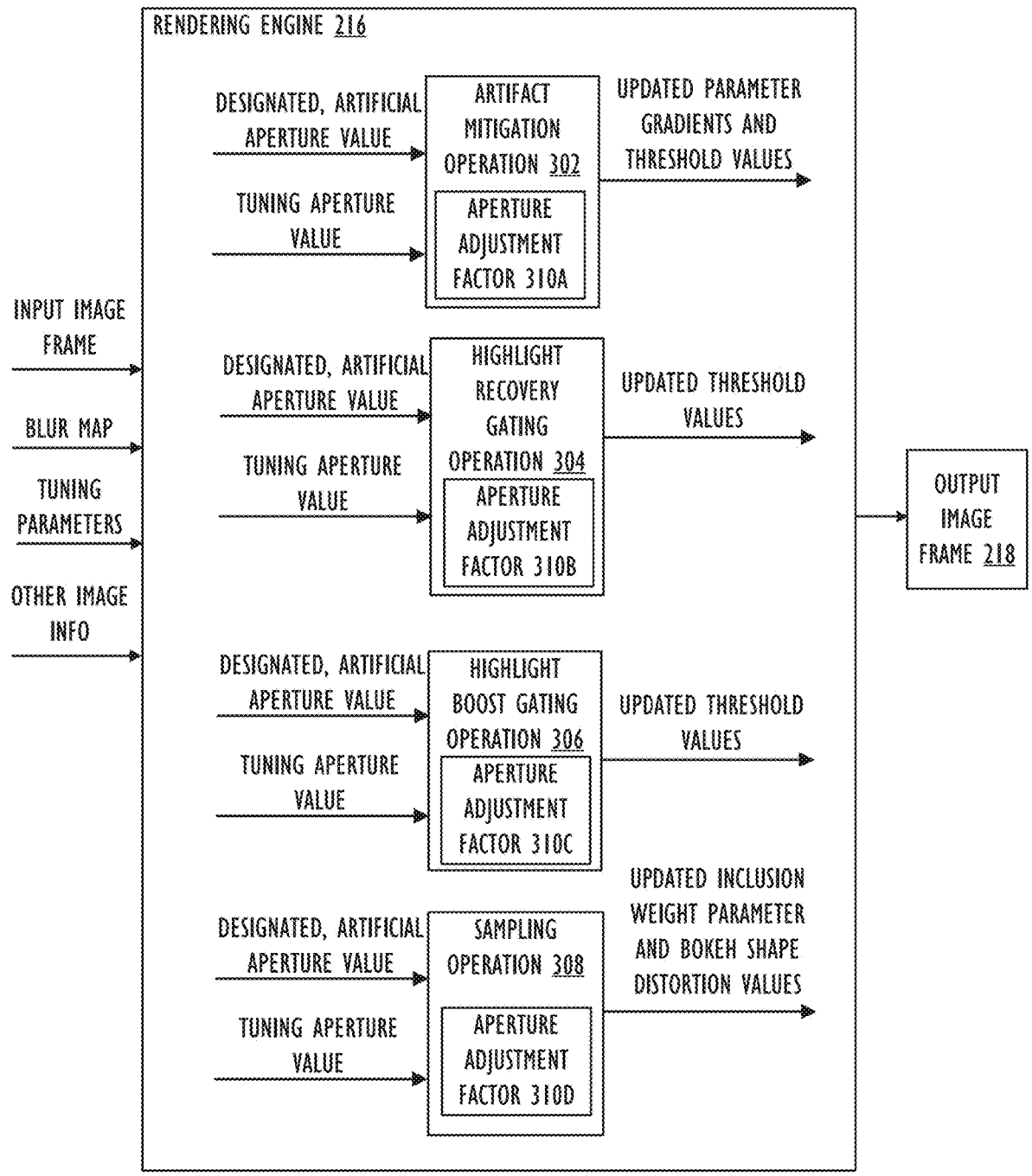
FIG. 3 illustrates modifying several SDOF parameters for multiple SDOF operations using aperture adjustment factors.

FIG. 3 conceptually illustrates several SDOF parameters a rendering engine 216 dynamically modifies with one or more aperture adjustment factors 310A-D. The rendering engine 216 may determine the value of aperture adjustment factors 310A-D based on the designated, artificial aperture value and/or the tuning aperture value. FIG. 3 depicts that the aperture adjustment factors 310A-D could affect SDOF parameters that influence the amount of blur (e.g., artifact mitigation operation 302) and/or the bokeh shape utilized to generate SDOF effects in one or more regions of output image frame 218 (e.g., sampling operation 308). Additionally, or alternatively, the rendering engine 216 may utilize aperture adjustment factors 310A-D to update threshold values to classify pixels and/or regions within an image frame. Although rendering engine 216 may also utilize the aperture adjustment factors 310A-D to dynamically modify SDOF parameters associated with an artifact mitigation operation 302, a highlight recovery gating operation 304, a highlight boosting gating operation 306, and a sampling operation 308, other embodiments of rendering engine 216 could utilize the aperture adjustment factors 310A-D for other SDOF operations that are known in the art to synthesize SDOF effects for output image frame 218.

Referring to artifact mitigation operation 302, artifacts can be present in output image frame 218 because of inaccuracies found in blur maps. For example, blur map errors can introduce blur transition artifacts that occur near foreground and background discontinuity regions. Blur map errors could occur when the image processing pipeline misclassifies one or more pixels as part of the foreground and/or in-focus regions when the pixels should belong to the background and/or out-of-focus regions of the output image frame 218. When the image processing pipeline synthetically blurs out background and/or out-of-focus regions, because of the misclassification, artifacts are not blurred or blurred much less than other pixels in the background of the output image frame 218. Using FIG. 1B as an example, the color of human subject 115's shirt (e.g. brown color) could be substantially similar to the color of ground 312 (e.g., brown soil/grass). When this occurs, an image processing pipeline may misclassify portions of the ground as foreground and/or part of the in-focus region of the output image frame 218. The error causes artifacts, where portions of the ground remain relatively in-focus while adjacent pixels in the background are blurred. Adjusting the artificial aperture value to larger values could cause the artifacts to become more visibly pronounced as the blur level increases in the adjacent background pixels (e.g., pixels in the synthetically blurred background region 155) and the artifacts remain relatively in-focus.

To reduce the effects of artifacts, artifact mitigation operation 302 may apply a synthetic blur for one or more other regions of the output image frame 218 (e.g., fall-off region 157 shown in FIG. 1B). Applying a synthetic blur to these other regions (e.g., fall-off region 157) that potentially include artifacts could reduce the visibility of the artifacts. For example, one type of artifact mitigation operation can determine a region of interest (e.g., a face mask) for an input image, assign depths within and/or outside the region of interest, and apply parameter gradients to generate different levels of blur based on the assigned depths and/or distance from the region of interest to generate output image frame 218. Adjusting levels of blur based on a selected region of interest (e.g., a human face) and depth information is described in more detail in U.S. Patent Application Publication No. 2018/0070007, filed Sep. 6, 2017 by Claus Molgaard et al. and entitled "Image Adjustments based on Depth of Field Estimations," which is herein incorporated by reference in its entirety. By synthetically generating fall-off regions around the region of interest, the artifact mitigation operation 302 is able to reduce the difference in the amount of blur for artifacts and the background region.

In FIG. 3, aperture adjustment factor 310A is able to dynamically adjust parameter gradients and/or threshold values for artifact mitigation operation 302. In one embodiment, the parameter gradients could represent blur levels applied to different regions of the output image frame 218 based on relative depths and/or distance from the region of interest. Using FIG. 1B as an example, the artifact mitigation operation 302 may apply no blur or a limited amount of blur within region of interest 159. For other regions, such as the synthetically blurred background region 155 and transition region 157, the artifact mitigation operation 302 could utilize one or more parameter gradients to set and/or modify the amount of blur based on depth assignments and/or distance in relation to the region of interest 159.

FIG. 3 illustrates that rendering engine 216 may utilize the designated, artificial aperture value and tuning aperture value to generate aperture adjustment factor 310A. The artifact mitigation operation 302 can then utilize the aperture adjustment factor 310A to increase or decrease the amount of synthetic blur associated with the parameter gradients and/or update threshold values, such as blur-radius gating thresholds, for identifying the region of interest (e.g., face mask). The aperture adjustment factor 310A could be a linear scaling factor that adjusts the strength of the artifact mitigation operation 302. As an example, the designated, artificial aperture value is set to f/2.0 and the tuning aperture value is set to f/4.0. The scaling factor (e.g., tuning aperture value/designated, artificial aperture value) would be two, resulting in doubling the strength of the artifact mitigation operation 302. In other words, the amount of blur added to each pixel according the blur map may be doubled. The rendering engine 216 could also apply the scaling factor to gating thresholds for the artifact mitigation operation 302 (e.g., face-mask gating thresholds). Other embodiments of rendering engine 216 could produce other values for aperture adjustment factor 310A, such as values based on a non-linear scaling factor and/or a lookup operation.

FIG. 3 also depicts that rendering engine 216 updates one or more thresholds values for highlight recovery gating operation 304 and highlight boosting gating operation 306 using aperture adjustment factors 310B and 310C, respectively. Similar to aperture adjustment factor 310A, aperture adjustment factors 310B and 310C could represent scaling factors or values derived from other operations, such as a lookup operation. The rendering engine 216 may use the threshold values to compute gating values (e.g., scores) that relate to highlight recovery and boosting operations. Highlight recovery and boosting operations typically modify pixel information (e.g., light and color intensity) for output pixels in output image frame 218 that belong to the background region of the output image frame 218 to more accurately reflect the brightness and color of clipped pixels. To determine the set of pixels perform highlight recovery and boosting operations, rendering engine 216 may use the aperture adjustment factors 310B and 310C to dynamically update the threshold values. The rendering engine 216 may then utilize the updated threshold values (e.g., a soft threshold, such as a smoothstep function) to determine whether an output pixel belongs to the background region of the output image frame 218.

In one or more embodiments, a rendering engine 216 may perform highlight recovery and boosting operations in instances where a light source's intensity causes each of the color channels of an image sensor pixel to become clipped in the background region of one or more input image frames 202. For example, clipping may occur where point light sources are found within the input image frames. When clipping occurs, the true color and light intensity values of the clipped pixels is unknown, since the image sensor is capped at its maximum or saturated value. The rendering engine 216 utilizes one or more gating values (e.g., background and clipped scores) to determine whether to perform highlight recovery and boosting operations. The gating values can also indicate the strength to perform highlight recovery and boosting operations when establishing the light intensity and color for clipped light sources. The rendering engine 216 may utilize the aperture adjustment factors 310B and 310C to prevent unintentional modification of the amount of highlight recovery and boosting that the rendering engine 216 performs for specific areas of the input image frame.

As previously discussed, the amount of the synthetic blur may be dynamically adjusted according to the designated, artificial aperture value. To prevent output pixels from inadvertently receiving highlight recovery and boosting operations when changing artificial aperture values, the rendering engine 216 adjusts the threshold values for the two operations 304 and 306 according to aperture adjustment factors 310B and 310C. As an example, the blur radius for an output pixel can increase by a scaling factor of two when the absolute aperture size represented by the designated, artificial aperture value is double the size of the absolute aperture size represented by the tuning aperture value. To compensate for the increase in blur radius, the threshold values for classifying the output pixels can also increase by the same or a corresponding scaling factor. By doing so, the rendering engine 216 is able to maintain the same set of output pixels that obtain highlight recovery and boosting operations using the tuning aperture value. Stated another way, adjusting the threshold values maintains the same regions of the output image frame 218 affected by highlight recovery and boosting operations, regardless of the designated, artificial aperture value.

In FIG. 3, the rendering engine 216 also performs sampling operation 308 to create SDOF effects for output image frame 218. Rather than spreading the light of each pixel onto all other pixels within the blurring radius and accumulating the results, sampling operation 308 may select, some number of pixels in the surrounding neighborhood of input image pixels (e.g., using a randomized distribution) to generate the SDOF effects. Sampling operation 308 may gather and weight the light and/or color information from the neighboring pixels to adjust the output value for a given pixel based on the accumulated gathered information. As an example, sampling operation 308 approximates SDOF effects by weighting the light and/or color information values from sampled neighborhood pixel. The weighting of light and/or color information values can be based on a determination of how prominently the neighborhood pixels affect an output pixel when rendering output image frame 218. Examples of performing sampling and weighting operations to generate output image frame 218 are described in more detail in U.S. patent application Ser. No. 15/990,154 filed May 25, 2018 by Richard Seely et al. and entitled "Shallow Depth of Field Rendering," which is herein incorporated by reference in its entirety.

In one or more embodiments, sampling operation 308 utilizes an inclusion weight parameter that can account for non-circular bokeh shapes. Specifically, the sampling operation 308 may cause the render engine 216 to produce non-circular, synthetic bokeh shapes that vary across of the image plane for output image frame 218. To render synthetic bokeh within output image frame 218, sampling operation 308 may utilize the inclusion weight parameter to reflect whether an output pixel is within a bokeh shape of a sampled point. Stated another way, when computing the light and/or color information for an output pixel, the inclusion weight parameter indicates whether a given sampled point affects the light and/or color information for the output pixel. For the purpose of this disclosure, the term "synthetic bokeh" refers to a type of synthetic blur rendered using one or more synthetic bokeh shapes in background highlight regions of image frame.

The sampling operation 308 can dynamically modify bokeh shapes that the inclusion weight parameter uses based on the aperture adjustment factor 310D. Similar to aperture adjustment factor 310A, aperture adjustment factor 310D could represent a scaling factor or a value derived from other operations, such as a lookup operation. The aperture adjustment factor 310D may modify a bokeh shape distortion parameter (e.g., bokeh shape distortion parameter 606 in FIG. 6) when computing the inclusion weight parameter. In one or more implementations, when computing the inclusion weight parameter, the sampling operation 308 may utilize symmetrical, circular-based bokeh shapes, where pixels at or near the image center of output image frame 218 generate symmetrical, bokeh circles and pixels farther away from the image center of output image frame 218 generate a compressed version of the symmetrical, bokeh circle. The sampling operation 308 may also generate a compressed version of the symmetrical bokeh circle (e.g., a non-circular bokeh shapes) for larger artificial aperture values and less compressed version of the bokeh shape (e.g., a complete circle) for smaller artificial aperture values. Other implementations of sampling operation 308 could use other shapes (e.g., polygon or star shapes) and/or vary the size of the bokeh shapes as the artificial aperture values change. The sampling operation 308 relating to modifying bokeh shapes is discussed in more detail with reference to FIGS. 5-7.

Figure 4:
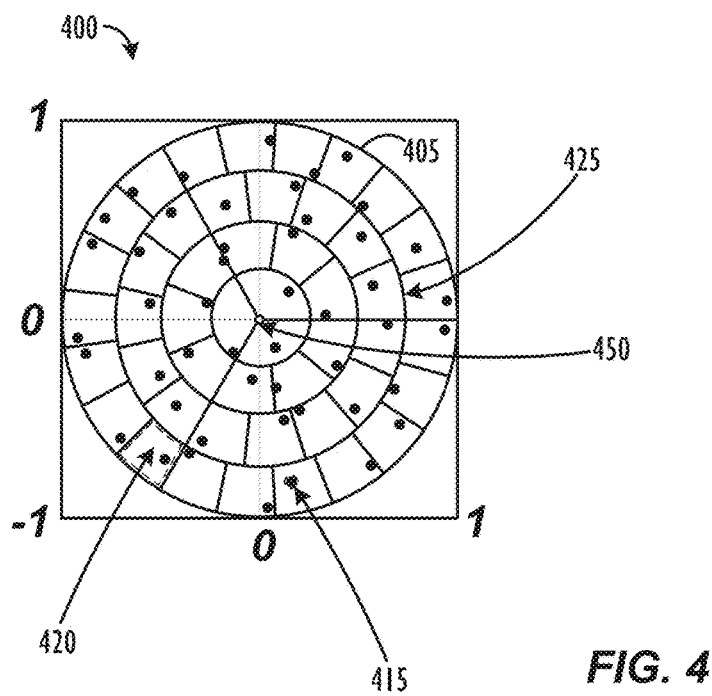
FIG. 4 illustrates an example of a generated plurality of candidate pixels for a particular output pixel, according to one or more embodiments.

FIG. 4 is an exemplary illustration of a sample window 400 containing a set of randomly-distributed sample pixels (also referred to herein as "candidate pixels") for an output pixel 450 located at the center of sample window 400. As previously discussed with reference to FIG. 3, the rendering engine 216 may perform a sampling operation 308 that determines whether a number of random candidate pixels affect a given output pixel 450. The sampling operation 318 may utilize one or more random or pseudo-random number sample generators to generate a number of randomly-distributed candidate pixels 415. In one or more implementations, because of the sparse nature of the sampling, any input image with structured high frequency content may risk producing unwanted aliasing artifacts in the sampled output image, which may be seen as banding or concentric circular patterns. In FIG. 4, to reduce the risk of unwanted aliasing artifacts, the sampling operation 308 can attempt to sample in a non-regular pattern by sampling a similar number of pixels (e.g., a single pixel) in each of a plurality of regions (e.g., equal-area regions) having uniform-sampling probabilities. This could result in any aliasing artifacts being spatially non-correlated.

To obtain a random distribution of sampled candidate pixels 415 within a circular window 405, a sampling operation may divide the circular window 405 into two or more rings 425, which may each be further subdivided into two or more segments 420. One or more candidate pixels 415 may be taken from each ring segment 420, where the sampling probability may be configured to be uniform across each ring segment 420. This approach may enforce uniformity of the sampling across the circular window 405, allowing for adequate and representative sampling of the circular window 405 with a potentially smaller number of samples than other techniques that do not sub-divide the sampling region into sub-regions of uniform sampling probability. Although FIG. 4 illustrates utilizing a circular window 405, other implementations of sampling window 400 could use other window shapes (e.g., polygon or rectangle shapes).

According to some embodiments, the randomly-generated distribution of sampled candidate pixels 415 may be specially configured, re-shaped, and/or weight-compensated for non-uniformity (e.g., to provide more equally-distributed coverage of the sampling region). According to other embodiments, the sampling operation may also employ a predetermined irregular patterns of sampling distributions to create a new random distribution of sample positions for each processed image. Examples of other implementations for generating randomly-sampled candidate pixel locations using a sampling window 400 for an inclusion weight parameter can be found in the U.S. patent application Ser. No. 15/990,154 previously referenced.

Figure 5:
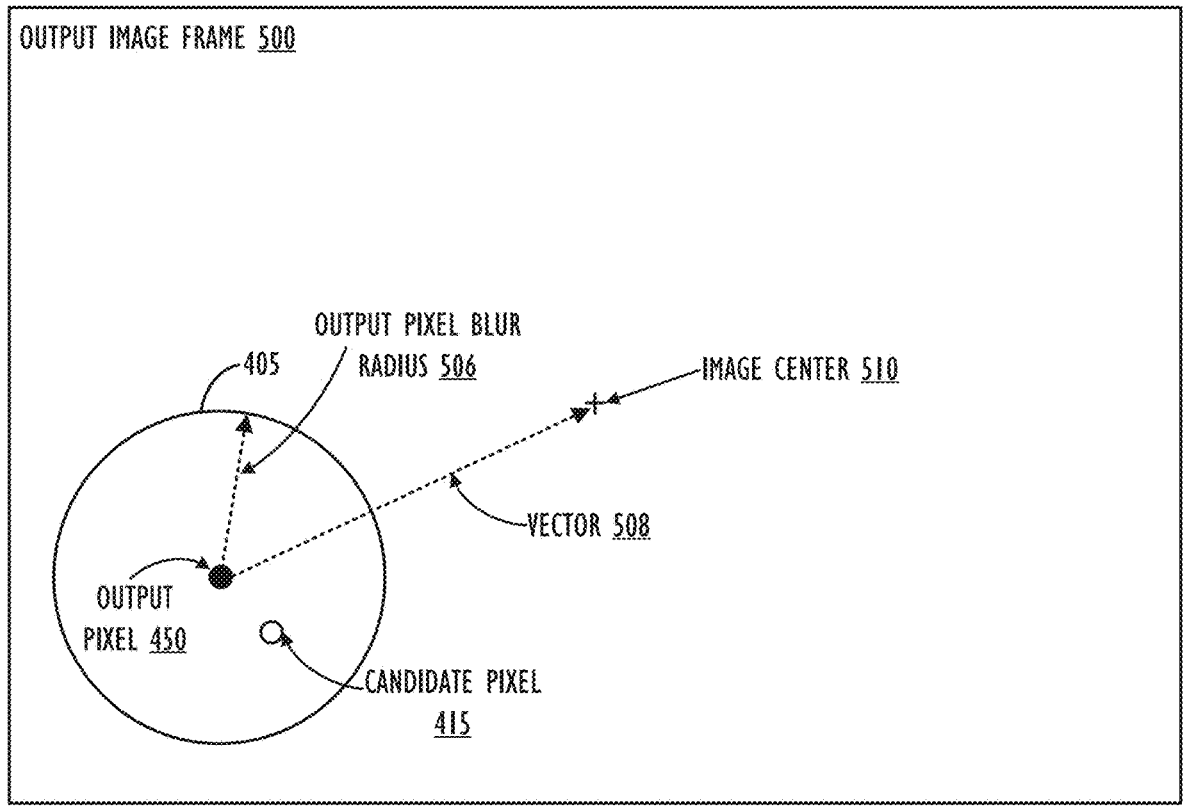
FIG. 5 illustrates an embodiment of an output image frame that includes an output pixel, a candidate pixel, and image center.

FIG. 5 illustrates an embodiment of an output image frame 500 that includes an output pixel 450, a candidate pixel 415, and image center 510. The image center 510 represents the optical center of lens when capturing the input image frame (e.g., input image frame 202) used to generate output image frame 500. In FIG. 5, vector 508 represents the vector between the output pixel 450 and the image center 510. As used herein, the term "output pixel" refers to a pixel that is represented in output image frame 500, which may be modified to produce SDOF effects. Each output pixel may be thought of as having a corresponding base "input" pixel at the same location of an input image frame (e.g., input image frame 202).

To compute an inclusion weight parameter, a sampling operation may first identify one or more candidate pixels 415 to test whether the candidate pixels 415 affect the output pixel 450. FIG. 5 illustrates that the output pixel 450 has a blur radius 506 for circular window 405. The circular window 405 for output pixel 450 represents a search region for selecting a random set of candidate pixels 415. Recall that the sampling operation may select candidate pixels 415 using a random or pseudo-random number sample generator. In FIG. 5, the circular window 405 has an output pixel blur radius 506 that defines the size of the circular window 405. As an example, the output pixel blur radius 506 could be a 10 pixel radius. Recall that the blur values, such as output pixel blur radius 506, are from a blur map, which correspond to estimated depths for pixels in a scene. Blur values that are father from the in-focus plane of the scene generally have a larger blurring radii.

Figure 6:
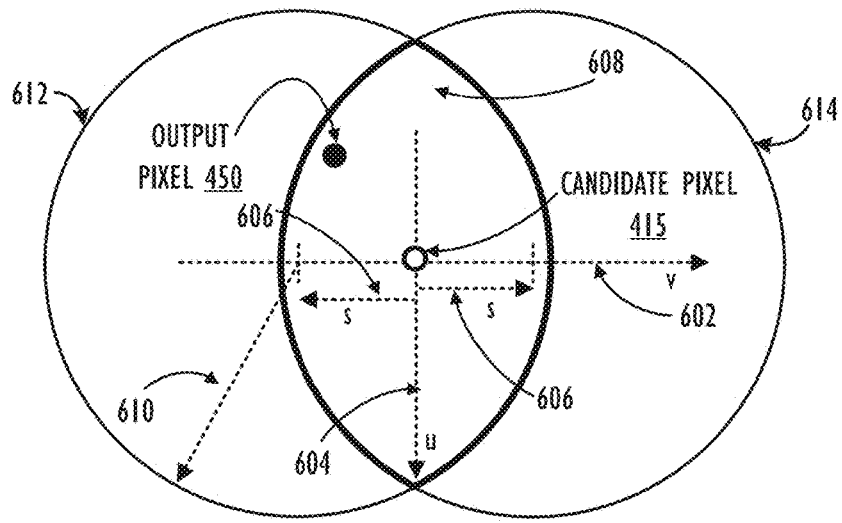
FIG. 6 illustrates an embodiment of a compressed bokeh shape used to identify whether a candidate pixel affects output pixel prior to rotation.
Figure 7:
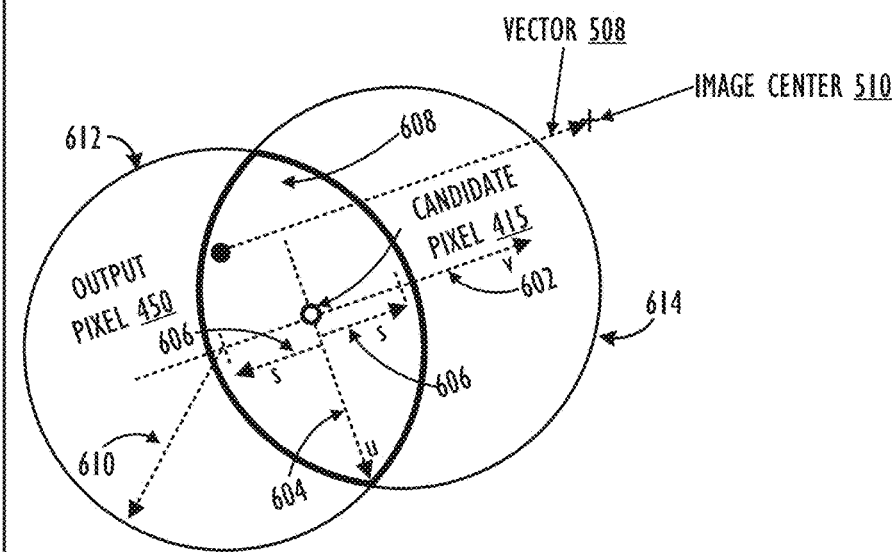
FIG. 7 illustrates an embodiment of a compressed bokeh shape used to identify whether a candidate pixel affects output pixel after rotation.

FIGS. 6 and 7 illustrates an embodiment of a compressed bokeh shape 608 used to identify whether a candidate pixel 415 affects output pixel 450. FIG. 6 illustrates the compressed bokeh shape 608, offset bokeh shape 612, and offset bokeh shape 614 prior to rotation, and FIG. 7 illustrates the compressed bokeh shape 608, offset bokeh shape 612, and offset bokeh shape 614 after rotation to align v axis 602 toward the image center 510 of the output image frame 500.

With reference to both FIGS. 6 and 7, after identifying candidate pixels 415 within the output pixel's 450 search window, for each candidate pixel 415, the sampling operation determines whether the candidate pixel 415 affects an output pixel's 450 color and/or light information and to what extent.

As shown in FIGS. 6 and 7, the sampling operation projects the output pixel 450 onto the coordinate system that includes the u axis 604 and v axis 602 and is centered on the candidate pixel 415. Offset bokeh shapes 612 and 614 represent bokeh shapes used to generate a compressed bokeh shape 608 for candidate pixel 415. The centers of offset bokeh shapes 612 and 614 are offset by a bokeh shape distortion parameter 606 that has a value of "s." The bokeh shape distortion parameter 606 that causes the centers of the offset bokeh shapes 612 and 614 to move from the location of candidate pixel 415 by a value of "s" along the v axis 602. As shown in FIG. 7, the centers of offset bokeh shapes 612 and 614 are shifted in opposite direction along the v axis 602 based on the bokeh shape distortion parameter 606. The resulting overlap region of offset bokeh shape 614 and offset bokeh shape 612 based on the bokeh shape distortion parameter 606 represents the compressed bokeh shape 608. The compressed bokeh shape 608 is a visual representation of the estimated shape of light that would be spread from candidate pixel 415 when captured on a much larger camera with a wide aperture lens. In one or more embodiments, the compressed bokeh shape 608 is a non-circular, bokeh shape that can be adjusted based on a designated, artificial aperture value.

As previously discussed, the inclusion weight parameter, which is visually represented by compressed bokeh shape 608, may be extended to handle non-circular blurring shapes, as well as blurring shapes that may vary across the image plane. For example, according to some embodiments, to model the physics of a larger aperture camera, it may be desirable to use non-circular blurring shapes that are aligned towards the image center. To achieve this, output pixel 450 may first be projected onto the coordinate space of the sampled candidate pixel's compressed bokeh shape 608. FIG. 7 illustrates that the sampling operation may project output pixel 450 by normalizing the candidate pixel's offset by its blur radius 610 and applying a rotation matrix, R (which may be, e.g., a 2×2 rotation matrix), to rotate a defined u-v coordinate system, such that the v axis 602 aligns towards the image center 510 (e.g., for ease of computation of the subsequent inclusion determination).

To define the compressed bokeh shape 608, the sampling operation projects the output pixel onto the coordinate space defined by the u axis 604 and v axis 602. The projected coordinates for output pixel 450 are defined by the equation 1:

$$\begin{bmatrix} Pu \\ Pv \end{bmatrix} = \frac{1}{Sr} \left( \begin{bmatrix} Ox \\ Oy \end{bmatrix} - \begin{bmatrix} Sx \\ Sy \end{bmatrix} \right) \times R \quad (1)$$

In equation 1, the Pu variable represents the projected coordinate value for output pixel 450 along the u axis 604, where after rotating the coordinate system, the u axis 604 is orthogonal to the vector between the output pixel 450 and image center of an output image frame. The Pv variable represents the projected coordinate value for output pixel 450 along the v axis 602, where after rotating the coordinate system, the v axis 602 aligns and is parallel to the vector between the output pixel 450 and image center 510 of the output image frame 500. The Ox and Oy variables represent the x and y coordinate values, respectively, for the output pixel 450. The Sx and Sy variables represent the x and y coordinate values, respectively, for the candidate pixel 415. The Sr variable represents the candidate pixel blur radius 610. The R variable represents the rotation matrix to align v axis 602 parallel to the vector 508 between the output pixel 450 and image center 510 of the output image frame 500. In one or more embodiments, the R variable may represent a 2×2 rotation matrix to rotate the coordinate system such that the v axis aligns 602 toward the image center of the output image frame.

The sampling operation may then compute the distance between the projected output pixel location and the center of the compressed bokeh shape 608 for candidate pixel 415, which accounts for bokeh shape distortion parameter 606. Equation 2, which is shown below, defines the distance the projected output pixel location and the center of the compressed bokeh shape 608 for candidate pixel 415.

$$Dp = \sqrt{Pu^2 + (|Pv|+s)^2} \qquad (2)$$

In equation 3, the Dp variable represents the computed distance between the projected output pixel location and the center of the compressed bokeh shape 608 for candidate pixel 415. In one or more implementations, if Dp has a value that is below 1.0, then the output pixel 450 lies within compressed bokeh shape 608. Conversely, if Dp is equal to or greater than 1.0, then output pixel 450 lies outside the compressed bokeh shape 608. Using FIG. 6 as an example, since output pixel 450 is found within the compressed bokeh shape 608, this would be reflective of a scenario wherein the Dp value for the output pixel 450 and candidate pixel 415 would be less than 1.0. The s variable represents the bokeh shape distortion parameter 606, which is equal to the distance between the image center 510 and the output pixel multiplied by the aperture adjustment factor. A larger value of s generates a more compressed bokeh shape 608 as the bokeh shape distortion parameter 606 moves the center of offset bokeh shapes 612 and 614 away from each other, and a smaller value of s generates a less compressed bokeh shape 608 as the center of offset bokeh shapes 612 and 614 moves closer together and towards the location of candidate pixel 415.

The computed distance between the projected output pixel location and the center of the compressed bokeh shape 608 for candidate pixel 415 can be rewritten as a modified Euclidean distance equation as shown in equation 3 below.

$$D = \left\| \begin{array}{c} |Pv| + k_s r_{output} \\ Pu \end{array} \right\| \qquad (3)$$

In equation 4, the variable D represents the computed distance between the projected output pixel location and the center of the compressed bokeh shape 608 for candidate pixel 415. The variables $k_s r_{output}$ represents the s variable shown in equation 3, which represents the bokeh shape distortion parameter 606. Specifically, variable $k_s$ represents a coefficient parameter that adjusts the bokeh shape distortion parameter 606 based on the aperture adjustment factor. In one example, the aperture adjustment factor may be a scaling factor (e.g., linear or non-linear factor) determined from the tuning aperture value and the designated, artificial aperture value (e.g., ratio defined as the tuning aperture value/designated, artificial aperture value). Other examples of an aperture adjustment factor may include values determined from other operations, such as a lookup operation. The variable $r_{output}$ represents a distance from the output pixel 450 to the image center 510 of the output image frame 500. Based on equation 4, a sampling operation generates a more compressed bokeh shape 608 when the absolute aperture size represented by the artificial aperture value increases and/or at the edges of the image frame.

Although FIGS. 5-7 illustrates utilizing and modifying circular bokeh shapes to determine an inclusion weight parameter for a candidate pixel 415, the disclosure is not limited to these particular implementations. For example, even though FIGS. 5-7 illustrate that offset bokeh shapes 612 and 614 are circles, other embodiments could use other offset bokeh shapes 612 and 614 such as heart shapes, star shapes, polygon shapes, octagon shapes, or combinations thereof. Additionally, or alternatively, one or more of the offset bokeh shapes 612 and 614 could vary in sizes. The use and discussion of FIGS. 5-7 are only examples to facilitate explanation and is not intended to limit the disclosure to this specific example.

Figure 8:
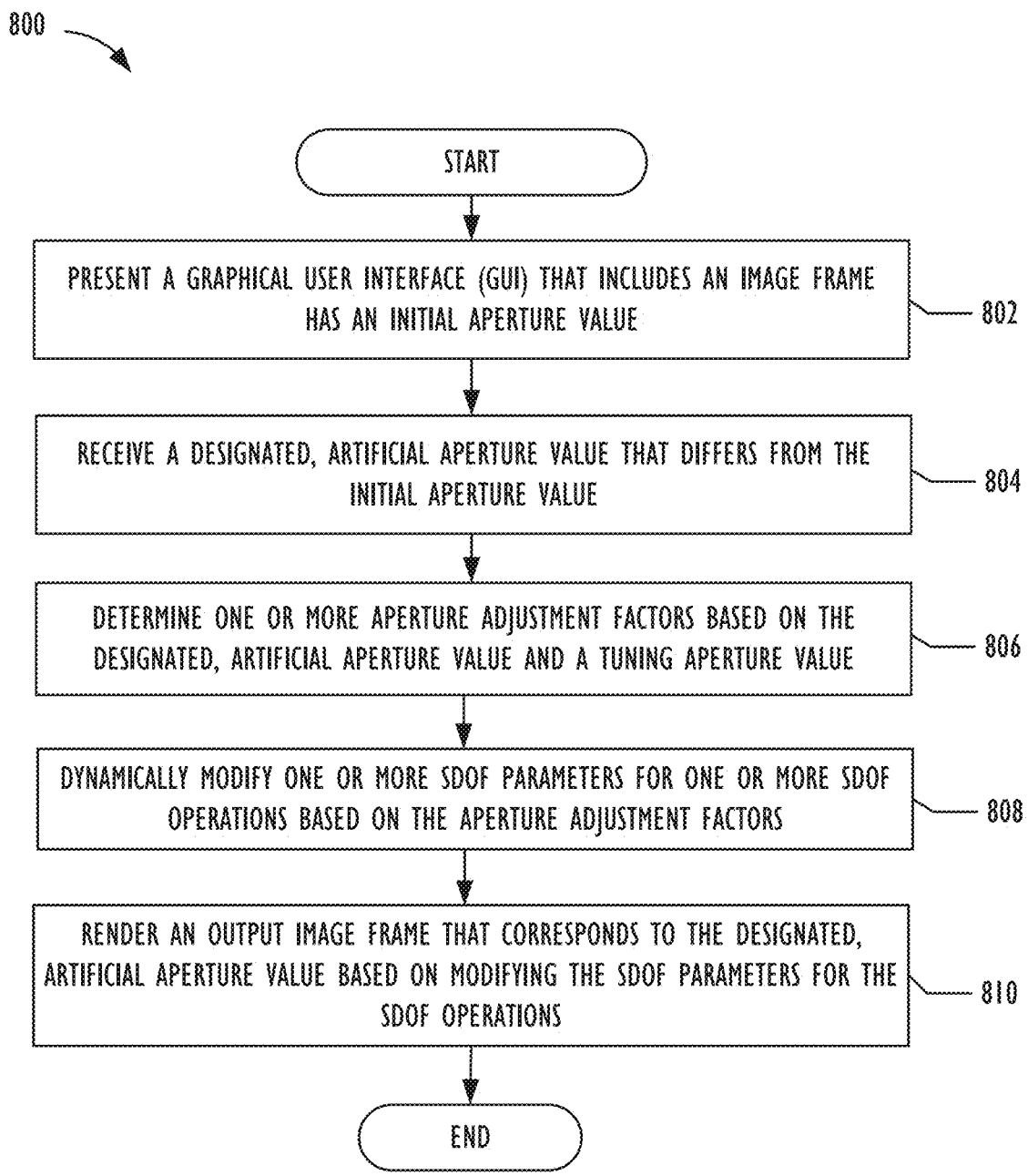
FIG. 8 depicts a flowchart illustrating a parameter adjustment operation for one or more SDOF parameters that correspond to one or more SDOF operations.

FIG. 8 depicts a flowchart illustrating a parameter adjustment operation 800 for one or more SDOF parameters that correspond to one or more SDOF operations. Using FIG. 3 as an example, a rendering engine 216 may implement the parameter adjustment operation 800 after receiving a designated, artificial aperture value that has a different aperture value than a tuning aperture value. The use and discussion of FIG. 8 is only an example to facilitate explanation and is not intended to limit the disclosure to this specific example. For example, although FIG. 8 illustrates that the blocks within parameter adjustment operation 800 are implemented in a sequential order, parameter adjustment operation 800 is not limited to this sequential order. For instance, one or more of the blocks, such as blocks 802 and 804, could be implemented in parallel.

Parameter adjustment operation 800 starts at block 802 and presents a GUI that includes an image frame that has an initial aperture value. In one example, the initial aperture value is a tuning aperture value optimized for an image processing pipeline. In another example, the initial aperture value represents the aperture value of the lens used to capture the input image. Other examples of the initial aperture value could include an artificial aperture value manually set by a user and/or automatically set by an application to view the image frame. Afterwards, parameter adjustment operation 800 moves to block 802 and receives a designated, artificial aperture value that differs from the initial aperture value. The parameter adjustment operation 800 may determine a designated, artificial aperture value, by having a user manually setting the designated, artificial aperture value using one or more GUI elements. In other implementations, the designated, artificial aperture value may not be manually set, and instead may be automatically set by the parameter adjustment operation 800 using information, such as application settings, user preferences, and/or history of SDOF processing for previous images.

Parameter adjustment operation 800 continues to block 806 and determines one or more aperture adjustment factors based on the designated, artificial aperture value and a tuning aperture value. For example, the parameter adjustment operation 800 can utilize the designated, artificial aperture value and tuning aperture value to generate an aperture adjustment scaling factor, such as a linear scaling factor and/or non-linear scaling factor (e.g., polynomial or square root) to dynamically adjust one or more SDOF parameter values. Additionally, or alternatively, the parameter adjustment operation 800 may use the designated, artificial aperture value to perform one or more lookup operations to determine an aperture adjustment factor.

At block 808, parameter adjustment operation 800 dynamically modifies one or more SDOF parameters for one or more SDOF operations based on the aperture adjustment factors, e.g., by modifying one or more default SDOF parameters to obtain updated plurality of SDOF parameters for performing one or more SDOF operations. Examples of SDOF parameters that parameter adjustment operation 800 may update from their default values using the aperture adjustment factors include parameter gradients for an artifact mitigation operation, gating threshold values for highlight recovery and boosting operations, and inclusion weight parameters and/or bokeh shape distortion (e.g., bokeh shape distortion parameter 606 in FIG. 6) for sampling operations. Afterwards, operation 800 moves to block 810 and renders an output image frame that correspond to the designated, artificial aperture value based on modifying the SDOF parameters for the SDOF operations.

Figure 9:
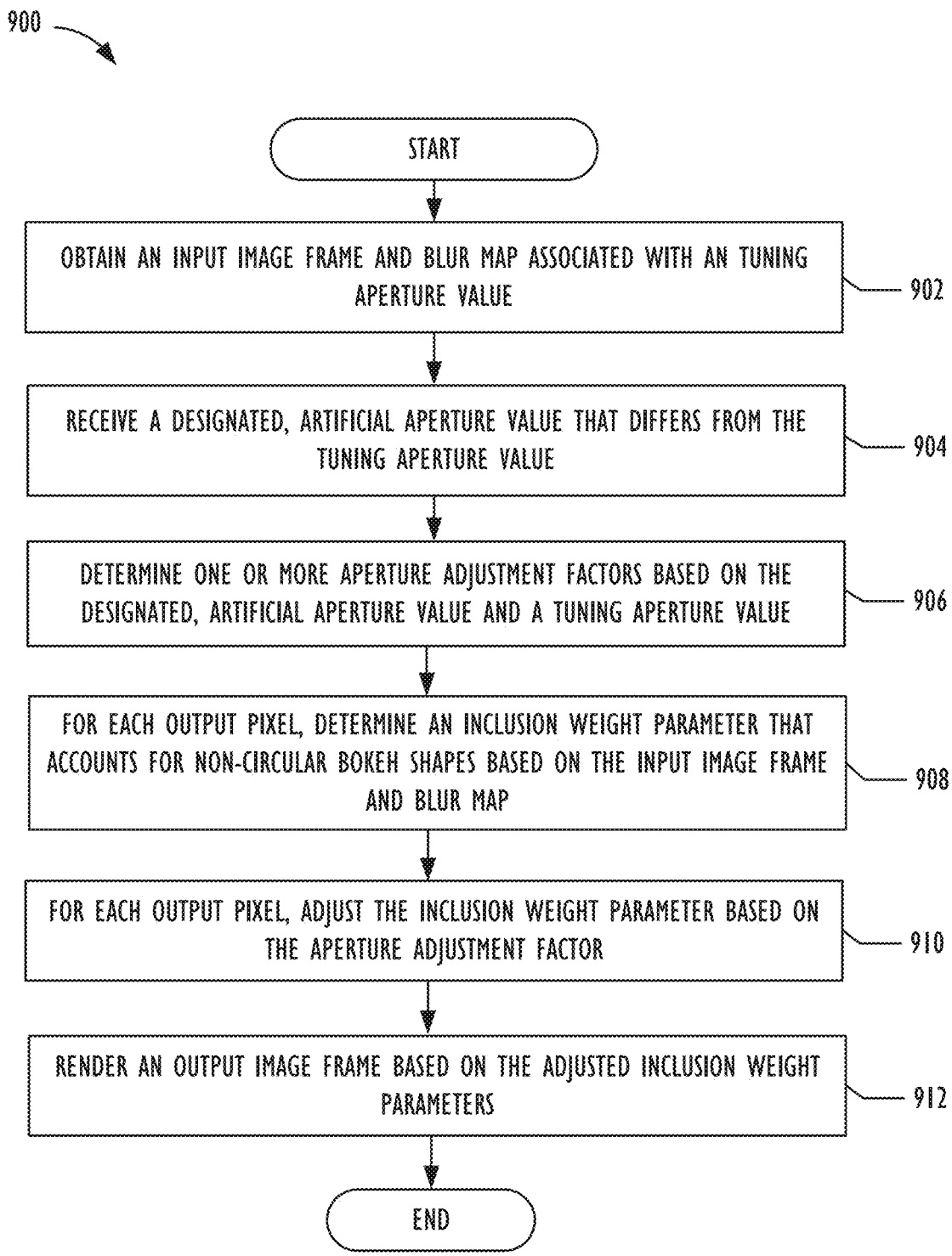
FIG. 9 depicts a flowchart illustrating a sampling operation that generates an inclusion weight parameter that accounts for multiple artificial aperture values and non-circular bokeh shapes.

FIG. 9 depicts a flowchart illustrating a sampling operation 900 that accounts generates an inclusion weight parameter that accounts for multiple artificial aperture values and non-circular bokeh shapes. Using FIG. 3 as an example, a rendering engine 216 may implement the sampling operation 900 after receiving a designated, artificial aperture value that has a different aperture value than a tuning aperture value. The use and discussion of FIG. 9 is only an example to facilitate explanation and is not intended to limit the disclosure to this specific example. As an example, although FIG. 9 illustrates that blocks within sampling operation 900 are implemented in a sequential order, sampling operation 900 is not limited to this sequential order. For instance, one or more of the blocks, such as blocks 908 and 910, could be implemented in parallel.

Sampling operation 900 starts at block 902 and obtains an input image and blur map associated tuning aperture value. Afterwards, sampling operation 900 moves to block 904 and receives a designated, artificial aperture value that differs from the tuning aperture. Block 902 of sampling operation 900 may be substantially similar to block 804 described with reference to parameter adjustment operation 800. Sampling operation 900 then continues to block 906 to determine aperture adjustment factors based on the designated, artificial aperture value and a tuning aperture value. Block 906 of sampling operation 900 may be substantially similar to block 806 described with reference to parameter adjustment operation 800.

Sampling operation 900 can use bokeh shapes to determine an inclusion weight parameter. At block 908, for each output pixel in an output image frame, the sampling operation 900 determines an inclusion weight parameter that accounts for non-circular bokeh shapes based on the input image frame and blur map. As an example, sampling operation 900 may first randomly identify candidate pixels within a search window for an output pixel. Afterward, sampling operation 900 projects an output pixel onto a coordinate space of a bokeh shape for the candidate pixel. The projected coordinates may be defined as shown in equations 1 and 2. In one or more implementations, when computing the inclusion weight parameter, the sampling operation 900 may utilize variable bokeh shapes, where pixels farther away from the image center of output image frame generate a more compressed version of a bokeh shape. Sampling operation 900 may use a variety of bokeh shapes and sizes for determining the inclusion weight parameter. Sampling operation 900 may also utilize different bokeh shapes to determine the inclusion weight parameters.

At block 910, for each output pixel, the sampling operation 900 may adjust the inclusion weight parameter based on the one or more aperture adjustment factors. The aperture adjustment factor applied may cause a more compressed version of a bokeh shape as the absolute aperture size represented by the designated, artificial aperture value increases. Conversely, sampling operation 900 may generate a less compressed version of the bokeh shape representative of the inclusion weight parameter for smaller artificial aperture values. Sampling operation 900 then moves to block 912 and renders an output image frame based on the adjusted inclusion weight parameters. At block 912, sampling operation 900 may perform a variety of other image processing operations not explicitly shown in FIG. 9. Examples of other image processing operations related to rendering synthetic SDOF images can be found in previously referenced U.S. patent application Ser. No. 15/990,154.

Exemplary Devices

Figure 10:
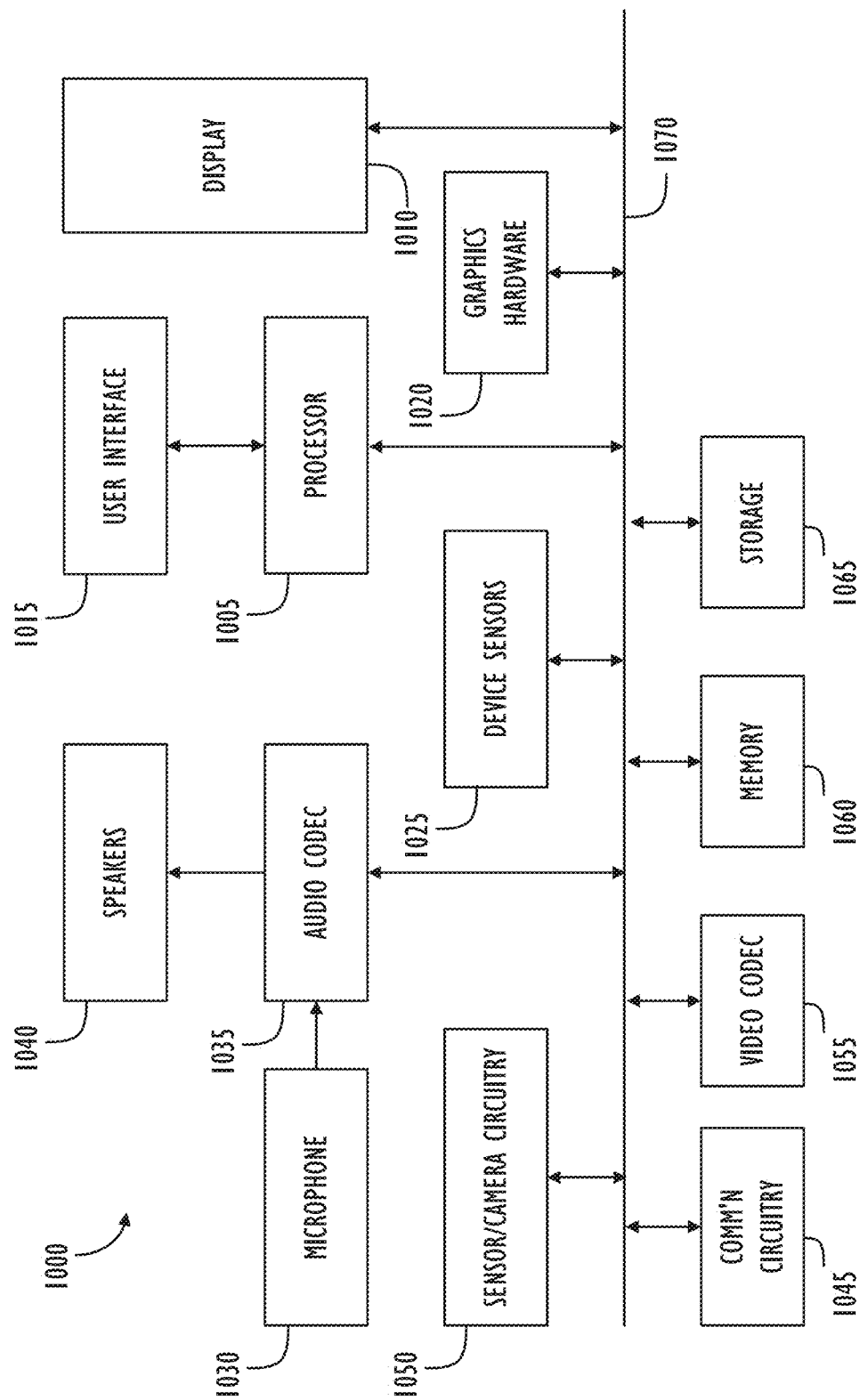
FIG. 10 is a block diagram illustrating a programmable imaging device in which one or more of the techniques disclosed herein may be implemented.

Turning now to FIG. 10, a simplified functional block diagram of illustrative electronic device 1000 is shown, according to one or more embodiments. Electronic device 1000 could be, for example, a mobile telephone, personal media device, portable camera, or a tablet, notebook or desktop computer system. As shown, electronic device 1000 may include processor 1005, display 1010, user interface 1015, graphics hardware 1020, device sensors 1025 (e.g., proximity sensor/ambient light sensor, accelerometer and/or gyroscope), microphone 1030, audio codec(s) 1035, speaker(s) 1040, communications circuitry 1045, image capture device 1050, which may, e.g., comprise single or multiple camera units/optical sensors having different characteristics, video codec(s) 1055, memory 1060, storage 1065, and communications bus 1070.

Processor 1005 may execute instructions necessary to carry out or control the operation of many functions performed by device 1000 (e.g., such as the generation and/or processing of images in accordance with the various embodiments described herein). Processor 1005 may, for instance, drive display 1010 and receive user input from user interface 1015. User interface 1015 can take a variety of forms, such as a button, keypad, dial, a click wheel, keyboard, display screen and/or a touch screen. User interface 1015 could, for example, be the conduit through which a user may view a captured video stream and/or indicate particular frame(s) that the user would like to have a synthetic SDOF image version of (e.g., by clicking on a physical or virtual button at the moment the desired frame is being displayed on the device's display screen). In one embodiment, display 1010 may display a video stream as it is imaged. In another embodiment, processor 1005 and/or graphics hardware 1020 and/or image capture circuitry may contemporaneously generate and/or display a synthetic SDOF version of the imaged video stream, which synthetic SDOF video stream may also be stored in memory 1060 and/or storage 1065. Processor 1005 may be a system-on-chip such as those found in mobile devices and include one or more dedicated graphics processing units (GPUs). Processor 1005 may be based on reduced instruction-set computer (RISC) or complex instruction-set computer (CISC) architectures or any other suitable architecture and may include one or more processing cores. Graphics hardware 1020 may be special purpose computational hardware for processing graphics and/or assisting processor 1005 perform computational tasks. In one embodiment, graphics hardware 1020 may include one or more programmable graphics processors, such as GPUs.

For the purposes of this disclosure, the term "processor" refers to a programmable hardware device that is able to process data from one or more data sources, such as memory. One type of "processor" is a general-purpose processor (e.g., a CPU or microcontroller) that is not customized to perform specific operations (e.g., processes, calculations, functions, or tasks), and instead is built to perform general compute operations. Other types of "processors" are specialized processor customized to perform specific operations (e.g., processes, calculations, functions, or tasks). Non-limiting examples of specialized processors include GPUs, floating-point processing units (FPUs), specialized digital signal processors (DSPs) for image processing, FPGAs, application-specific integrated circuits (ASICs), and embedded processors (e.g., universal serial bus (USB) controllers).

Image capture device 1050 may comprise one or more camera units configured to capture images, e.g., at different zoom levels or at different resolutions, which may be processed to generate a single synthetic SDOF image for each desired 'instance' of the scene (e.g., 15 fps, 30 fps, only when a capture is indicated by a user, etc.), in accordance with this disclosure. Output from image capture device 1050 may be processed, at least in part, by video codec(s) 1055 and/or processor 1005 and/or graphics hardware 1020, and/or a dedicated image processing unit incorporated within image capture device 1050. Images so captured may be stored in memory 1060 and/or storage 1065. Memory 1060 may include one or more different types of media used by processor 1005, graphics hardware 1020, and image capture device 1050 to perform device functions. For example, memory 1060 may include memory cache, read-only memory (ROM), and/or random access memory (RAM). Storage 1065 may store media (e.g., audio, image and video files), computer program instructions or software, preference information, device profile information, and any other suitable data. Storage 1065 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1060 and storage 1065 may be used to retain computer program instructions or code organized into one or more modules and written in any desired computer programming language. When executed by, for example, processor 1005 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device comprising instructions stored thereon to cause one or more processors to:
   obtain a first image frame comprising a first pixel and second pixel having pixel values;
   obtain a blur map that comprises a first blur value for the first pixel and a second blur value for the second pixel;
   determine the second pixel is a candidate pixel for the first pixel based on the first blur value;
   determine an inclusion weight parameter that is indicative of whether the first pixel is within a bokeh shape of the second pixel; and
   determine an output value for the first pixel based on the inclusion weight parameter.

2. The non-transitory program storage device of claim 1, wherein the bokeh shape of the second pixel is distorted based on a designated, artificial aperture value for an output image frame.

3. The non-transitory program storage device of claim 2, further comprising instructions stored thereon to cause the one or more processors to:
   obtain a tuning aperture value associated with the first image frame, wherein the designated, artificial aperture value causes the bokeh shape of the second pixel to become compressed when the designated, artificial aperture value is larger than the tuning aperture value.

4. The non-transitory program storage device of claim 1, wherein the bokeh shape is a compressed circle.

5. The non-transitory program storage device of claim 2, wherein the first image frame includes an image center, and wherein distortion of the bokeh shape of the second pixel is based on distance between the first pixel and the image center and the designated, artificial aperture value.

6. The non-transitory program storage device of claim 5, wherein an amount of distortion applied to the bokeh shape of the second pixel is based, at least in part, on a location of the first pixel with respect to an edge of the first image frame.

7. The non-transitory program storage device of claim 1, wherein the instructions that cause the one or more processors to determine the inclusion weight parameter further comprise instructions that cause the one or more processors to:
   project the first pixel onto the bokeh shape of the second pixel;
   align the bokeh shape of the second pixel along a vector formed from the first pixel to an image center of the first image frame; and
   compute a distance value from the first pixel to a center of the bokeh shape of the second pixel.

8. The non-transitory program storage device of claim 7, wherein the distance value from the first pixel to the center of the bokeh shape of the second pixel indicates whether first pixel is within a bokeh shape of the second pixel.

9. An imaging system, comprising:
   an image capture device;
   a programmable control device; and
   a memory coupled to the programmable control device, wherein instructions are stored in the memory, and wherein the instructions, when executed, cause the programmable control device to:
   obtain a first image frame from the image capture device, the first image frame comprising at least a first pixel and second pixel having pixel values;
   obtain a blur map that comprises a first blur value for the first pixel and a second blur value for the second pixel;
   determine the second pixel is a candidate pixel for the first pixel based on the first blur value;
   determine an inclusion weight parameter that is indicative of whether the first pixel is within a bokeh shape of the second pixel; and
   determine an output value for the first pixel based on the inclusion weight parameter.

10. The imaging system of claim 9, wherein the bokeh shape of the second pixel is distorted based on a designated, artificial aperture value for an output image frame.

11. The imaging system of claim 10, further comprising instructions stored in the memory to cause the programmable control device to:

obtain a tuning aperture value associated with the first image frame, wherein the designated, artificial aperture value causes the bokeh shape of the second pixel to become compressed when the designated, artificial aperture value is larger than the tuning aperture value.

12. The imaging system of claim 10, wherein the first image frame includes an image center, and wherein distortion of the bokeh shape of the second pixel is based on distance between the first pixel and the image center and the designated, artificial aperture value.

13. The imaging system of claim 12, wherein an amount of distortion applied to the bokeh shape of the second pixel is based, at least in part, on a location of the first pixel with respect to an edge of the first image frame.

14. The imaging system of claim 9, wherein the instructions to determine the inclusion weight parameter further comprise instructions that cause the programmable control device to:

project the first pixel onto the bokeh shape of the second pixel;

align the bokeh shape of the second pixel along a vector formed from the first pixel to an image center of the first image frame; and compute a distance value from the first pixel to a center of the bokeh shape of the second pixel.

15. An image processing method, comprising:

obtaining a first image frame from the image capture device, the first image frame comprising at least a first pixel and second pixel having pixel values;

obtaining a blur map that comprises a first blur value for the first pixel and a second blur value for the second pixel;

determining the second pixel is a candidate pixel for the first pixel based on the first blur value;

determining an inclusion weight parameter that is indicative of whether the first pixel is within a bokeh shape of the second pixel; and determining an output value for the first pixel based on the inclusion weight parameter.

16. The method of claim 15, wherein the bokeh shape of the second pixel is distorted based on a designated, artificial aperture value for an output image frame.

17. The method of claim 16, further comprising:

obtaining a tuning aperture value associated with the first image frame, wherein the designated, artificial aperture value causes the bokeh shape of the second pixel to become compressed when the designated, artificial aperture value is larger than the tuning aperture value.

18. The method of claim 16, wherein the first image frame includes an image center, and wherein distortion of the bokeh shape of the second pixel is based on distance between the first pixel and the image center and the designated, artificial aperture value.

19. The method of claim 18, wherein an amount of distortion applied to the bokeh shape of the second pixel is based, at least in part, on a location of the first pixel with respect to an edge of the first image frame.

20. The method of claim 15, wherein determining the inclusion weight parameter further comprises:

projecting the first pixel onto the bokeh shape of the second pixel;

aligning the bokeh shape of the second pixel along a vector formed from the first pixel to an image center of the first image frame; and computing a distance value from the first pixel to a center of the bokeh shape of the second pixel.

* * * * *